US012556646B2

(12) United States Patent
Lehtiniemi et al.

(10) Patent No.: US 12,556,646 B2
(45) Date of Patent: Feb. 17, 2026

(54) VIDEO CONFERENCE CALLS

(71) Applicant: Nokia Technologies Oy, Espoo (FI)

(72) Inventors: Arto Juhani Lehtiniemi, Tampere (FI);
Antti Johannes Eronen, Tampere (FI);
Miikka Tapani Vilermo, Tampere (FI)

(73) Assignee: Nokia Technologies Oy, Espoo (FI)

( * ) Notice: Subject to any disclaimer, the term of this patent is extended or adjusted under 35 U.S.C. 154(b) by 144 days.

(21) Appl. No.: 18/449,243

(22) Filed: Aug. 14, 2023

(65) Prior Publication Data

US 2024/0080406 A1  Mar. 7, 2024

(51) Int. Cl.
*H04N 5/262* (2006.01)

(52) U.S. Cl.
CPC ................ *H04N 5/2624* (2013.01)

(58) Field of Classification Search
CPC .. H04N 5/2624; H04N 7/147; H04N 21/4312; H04N 7/152; H04N 7/15; H04N 5/265
USPC ....................................... 348/14.07
See application file for complete search history.

(56) References Cited

U.S. PATENT DOCUMENTS

| 2007/0211141 | A1* | 9/2007 | Christiansen | H04L 65/80 |
| | | | | 348/E7.083 |
| 2009/0116652 | A1 | 5/2009 | Kirkeby et al. | |
| 2015/0244981 | A1 | 8/2015 | Johnson | |
| 2016/0337602 | A1 | 11/2016 | Ramon | |
| 2019/0373216 | A1 | 12/2019 | Cutler et al. | |
| 2022/0139356 | A1* | 5/2022 | Simmons | H04N 7/147 |
| | | | | 345/635 |

FOREIGN PATENT DOCUMENTS

| JP | H09-284404 A | 10/1997 |
| JP | 2017-028608 A | 2/2017 |
| JP | 2017-512427 A | 5/2017 |
| JP | 2019-220848 A | 12/2019 |
| JP | 2022-109048 A | 7/2022 |
| WO | 2019/101895 A1 | 5/2019 |
| WO | 2020/020668 A1 | 1/2020 |
| WO | 2021/133484 A1 | 7/2021 |

(Continued)

OTHER PUBLICATIONS

Office Action received for corresponding Japanese Patent Application No. 2023-142001 dated Sep. 2, 2024, 3 pages of Office Action and 2 pages of Summary available.

(Continued)

*Primary Examiner* — Yosef K Laekemariam
(74) *Attorney, Agent, or Firm* — McCarter & English LLP

(57) ABSTRACT

An apparatus and method is disclosed. An example embodiment of the method may comprise receiving audio and video data from a plurality of user devices as part of a conference call, the video data representing a user of the respective user device and identifying one or more of the user devices as having a spatial audio capture capability. Another operation may comprise displaying, or causing display of, the video data from the user devices in different respective windows of a user interface. The respective windows for the identified one or more user devices may be displayed in an enlarged format so as to have a wider background region than for windows for the user devices without a spatial capture capability.

16 Claims, 8 Drawing Sheets

(56) References Cited

FOREIGN PATENT DOCUMENTS

| WO | 2022/060349 A1 | 3/2022 |
| WO | 2022/165147 A1 | 8/2022 |

OTHER PUBLICATIONS

Extended European Search Report received for corresponding European Patent Application No. 22193912.7, dated Mar. 2, 2023, 10 pages.
Office Action received for corresponding Japanese Patent Application No. 2023-142001 dated Dec. 24, 2024, 2 pages of office action and 2 pages of summary available.

* cited by examiner

VIDEO CONFERENCE CALLS

TECHNICAL FIELD

Example embodiments relate to an apparatus, method and computer program associated with video conference calls.

BACKGROUND

A conference call is a communications session between multiple user devices and therefore multiple users or parties associated with the respective user devices. At a time a conference call is established, one or more communications channels may be established between the user devices, possibly using a conference server.

A video conference call may involve the user devices transmitting captured video and audio data to the other user devices as part of the communications session. The video and audio data may be streamed via, for example, a conference server. The video data captured by a particular user device may be displayed on a display device of one or more other user devices, for example in a window of a user interface. Respective windows may be associated with the different user devices that transmit their video data as part of the communications session. The audio data captured by the particular user device may be output via one or more loudspeakers, earbuds, earphones or headphones of the one or more other user devices.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for: receiving audio and video data from a plurality of user devices as part of a conference call, the video data representing a user of the respective user device; identifying one or more of the user devices as having a spatial audio capture capability; displaying, or causing display of, the video data from the user devices in different respective windows of a user interface, wherein the respective windows for the identified one or more user devices is or are displayed in an enlarged format so as to have a wider background region than for windows for the user devices without a spatial capture capability.

The audio data may represent, at least in part, speech of the user of the respective user device captured using the user device's audio capture capability.

The identifying means may be configured to identify user devices as having a spatial audio capture capability and which can track a position of the user over time.

The displaying means may be configured to display the one or more enlarged format windows such that the width and/or format of the background region is based on whether the tracking uses three degrees of freedom (3DoF) or six degrees of freedom (6DoF).

The width of the background region may be greater if the tracking uses six degrees of freedom (6DoF) than if the tracking uses three degrees of freedom (3DoF).

The enlarged format of the background region may use a wider-angle image format if the tracking uses six degrees of freedom (6DoF) than if the tracking uses three degrees of freedom (3DoF).

The displaying means may be configured to display the one or more enlarged format windows responsive to an amount of tracked movement of the user being over a predetermined threshold.

The width of the background region may be increased with an increase in an amount of tracked movement of the user.

The enlarged format of the background region may be set to a wider-angle image format responsive to an amount of tracked movement of the user being over a predetermined threshold.

The audio data for the identified one or more user devices may be rendered so as to be perceived as coming from a direction based on the tracked position of the user.

The apparatus may further comprise means for receiving selection of one or more particular user devices based on selection of one or more of the enlarged format windows, the displaying means being configured to further increase the size of the enlarged format windows based the selection.

The audio data from the one or more selected user devices may be rendered so as to be coming from a position within a wider range of positions based on the tracked position of the respective user, than for the audio data from a non-selected user device.

The selection means may be configured to receive selection via one or more of: an input received using the user interface corresponding to the particular enlarged window; and a current speaker identified using the audio data from the user device associated with the particular enlarged window.

The background region may comprise: video data representing captured video around or outside of at least part of the user as part of the conference call; or a predetermined image or video clip.

According to a second aspect, this specification describes a method, comprising: receiving audio and video data from a plurality of user devices as part of a conference call, the video data representing a user of the respective user device; identifying one or more of the user devices as having a spatial audio capture capability; displaying, or causing display of, the video data from the user devices in different respective windows of a user interface, wherein the respective windows for the identified one or more user devices is or are displayed in an enlarged format so as to have a wider background region than for windows for the user devices without a spatial capture capability.

The audio data may represent, at least in part, speech of the user of the respective user device captured using the user device's audio capture capability.

The identifying may identify user devices as having a spatial audio capture capability and which can track a position of the user over time.

The displaying may display the one or more enlarged format windows such that the width and/or format of the background region is based on whether the tracking uses three degrees of freedom (3DoF) or six degrees of freedom (6DoF).

The width of the background region may be greater if the tracking uses six degrees of freedom (6DoF) than if the tracking uses three degrees of freedom (3DoF).

The enlarged format of the background region may use a wider-angle image format if the tracking uses six degrees of freedom (6DoF) than if the tracking uses three degrees of freedom (3DoF).

The displaying may display the one or more enlarged format windows responsive to an amount of tracked movement of the user being over a predetermined threshold.

The width of the background region may be increased with an increase in an amount of tracked movement of the user.

The enlarged format of the background region may be set to a wider-angle image format responsive to an amount of tracked movement of the user being over a predetermined threshold.

The audio data for the identified one or more user devices may be rendered so as to be perceived as coming from a direction based on the tracked position of the user.

The apparatus may further comprise receiving selection of one or more particular user devices based on selection of one or more of the enlarged format windows, the displaying further increasing the size of the enlarged format windows based the selection.

The audio data from the one or more selected user devices may be rendered so as to be coming from a position within a wider range of positions based on the tracked position of the respective user, than for the audio data from a non-selected user device.

The selection may receive selection via one or more of: an input received using the user interface corresponding to the particular enlarged window; and a current speaker identified using the audio data from the user device associated with the particular enlarged window.

The background region may comprise: video data representing captured video around or outside of at least part of the user as part of the conference call; or a predetermined image or video clip.

According to a third aspect, this specification describes a computer program comprising instructions for causing an apparatus to perform at least the following: receiving audio and video data from a plurality of user devices as part of a conference call, the video data representing a user of the respective user device; identifying one or more of the user devices as having a spatial audio capture capability; displaying, or causing display of, the video data from the user devices in different respective windows of a user interface, wherein the respective windows for the identified one or more user devices is or are displayed in an enlarged format so as to have a wider background region than for windows for the user devices without a spatial capture capability.

The third aspect may also comprise any feature of the second aspect.

According to a fourth aspect, this specification describes a computer-readable medium (such as a non-transitory computer-readable medium) comprising program instructions stored thereon for performing at least the following: receiving audio and video data from a plurality of user devices as part of a conference call, the video data representing a user of the respective user device; identifying one or more of the user devices as having a spatial audio capture capability; displaying, or causing display of, the video data from the user devices in different respective windows of a user interface, wherein the respective windows for the identified one or more user devices is or are displayed in an enlarged format so as to have a wider background region than for windows for the user devices without a spatial capture capability.

The fourth aspect may also comprise any feature of the second aspect.

According to a fifth aspect, this specification describes an apparatus comprising: at least one processor; and at least one memory including computer program code which, when executed by the at least one processor, causes the apparatus to: receive audio and video data from a plurality of user devices as part of a conference call, the video data representing a user of the respective user device; identify one or more of the user devices as having a spatial audio capture capability; display, or cause display of, the video data from the user devices in different respective windows of a user interface, wherein the respective windows for the identified one or more user devices is or are displayed in an enlarged format so as to have a wider background region than for windows for the user devices without a spatial capture capability.

The fifth aspect may also comprise any feature of the second aspect.

BRIEF DESCRIPTION OF DRAWINGS

Example embodiments will now be described, by way of non-limiting example, with reference to the accompanying drawings, in which.

DETAILED DESCRIPTION

Figure 1:
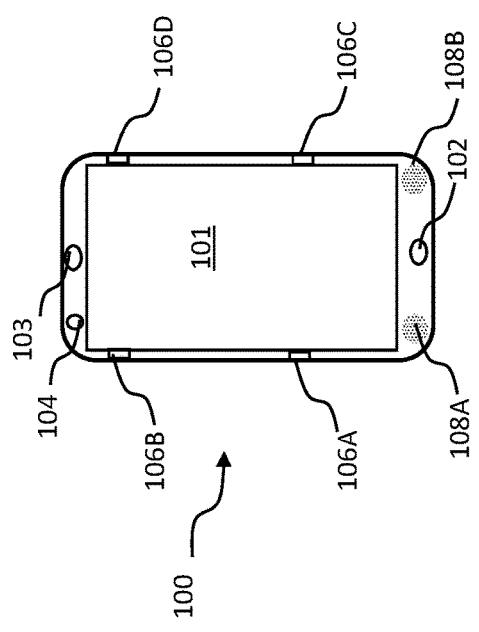
FIG. 1 is a front plan view of a user device.

Example embodiments relate to an apparatus, method and computer program associated with video conference calls.

A video conference call, or simply video conference, is a communications session between multiple user devices and therefore users or parties associated with the respective user devices. The communications session may involve the transmission of video and audio data captured by one user device to one or more other user devices that are part of the call or communications session.

The video data may be output to a display device of the one or more other user devices, for example in respective windows of a user interface on the one or more other user devices.

The audio data may be output via one or more loudspeakers of, or associated with, the one or more other user devices. For example, the audio data may be output to earbuds, earphones, headphones or a head-mounted device (HMD) in wired or wireless communication with one or more user devices.

A video conference may involve one or more communications channels being set-up between two or more user devices over a communications network, and therefore between users or parties associated with the respective devices. A conference session may comprise, for example, one or more channels set up between two or more devices which are participants of the conference session. The one or more communications channels may be established at the time of establishing the conference session to provide, typically, a multicast data feed from a given user device to each of the other user devices in real-time or near real-time. The one or more communications channels may be bi-directional communications channels.

A user device may comprise any device operable by one or more users and configured to transmit and receive data over a communications network.

A user device may comprise processing functionality for executing one or more applications, for example a video conference application. The video conference application may comprise sub-functionality of another application, such as a social media application.

A user device may also comprise one or more input modules and one or more output modules.

For example, a user device may comprise one or more input transducers and one or more output transducers.

For example, the one or more input transducers may comprise one or more microphones for converting sound waves to electrical signals which may be stored, processed and transmitted as audio data.

If two or more microphones are provided, the user device may be capable of producing a spatial audio signal which includes a spatial percept enabling a listening user at a receiving user device to perceive where one or more sounds, such as speech from a user of the transmitting user device, is or are coming from.

For example, it may also be possible for a user device to track a user's position relative to their user device, for example to determine one or both of orientation and translational position over time. Tracking only the orientation of a user may be referred to as three degrees of freedom (3DoF) tracking. Tracking also translational movement of a user may be referred to as six degrees of freedom (6DoF) tracking. Tracking a user's position may use various video and/or audio techniques, as will be known. Tracking a user's position may alternatively, or additionally, use data from one or more sensors which may be carried by the user, such as, but not limited to, one or more of accelerometers, a global positioning system (GPS) receiver or similar, a compass, radar technology, one or more light sensors, one or more cameras etc. Such sensors may be used in known technology areas, such as in head tracking, trajectory estimation and location estimation.

For example, the one or more output transducers may comprise one or more loudspeakers for converting electrical signals into sound waves. If two or more loudspeakers are provided, the user device, or an associated device such as earbuds, earphones, headphones or HMD may be capable of stereo and even spatial audio rendering, which may take account of the abovementioned 3DoF or 6DoF tracking.

For example, audio data received as part of a video conference call may be rendered spatially so that a first, listening user, may perceive the direction of audio received from a second, other user as coming from a particular part of the audio field around the listening user. As the second user moves within the window, the perceived direction of the audio data may also change so that it tracks the user's movement, for example from the left side to the right side of the audio field.

For example, a user device may also comprise one or more cameras for capturing video images which can be stored, processed and transmitted as video data.

For example, a user device may comprise one or more displays which may comprise any form of electronic display which may or may not be a touch-sensitive display. In the case of a touch-sensitive display, the display may also provide a form of input module, for example to receive and invoke selection commands based on detecting a touch input corresponding to a particular user interface element being displayed by the touch-sensitive display.

A user device may also comprise one or more other input modules, such as one or more of an accelerometer and gyroscope for generating motion data from which can be determined motion characteristics of the user device. A user device may also comprise one or more positioning receivers, such as a GNSS (Global Navigation Satellite System) receiver, for determining the geographic position of the user device.

A user device may comprise, but is not limited to, a smartphone, a digital assistant, a digital music player, a personal computer, a laptop, a tablet computer or a wearable device such as a smartwatch. A user device may be capable of establishing a communication session with one or more other user devices via a communications network, e.g. a conference session.

A user device may be configured to transmit and receive data using protocols for 3G, 4G, LTE, 5G or any future generation communication protocol. The user device may comprise means for short-range communications using, for example, Bluetooth, Zigbee or WiFi. The user device may comprise one or more antennas for communicating with external devices.

Referring to FIG. 1, an example first user device is shown in the form of a smartphone 100.

The smartphone 100 may comprise, on a front side, a touch-sensitive display (hereafter "display") 101, a microphone 102, a loudspeaker 103 and a front-facing camera 104. The smartphone 100 may additionally comprise a rear-facing camera (not shown) on a rear side of the smartphone. The front-facing camera 104 may be enabled during, for example, enablement of a video conference application whereby video data captured by the front-facing camera may be transmitted over an established conference session.

The smartphone 100 may also comprise additional microphones 106A-106D at different positions on the smartphone.

As shown, first to fourth additional microphones 106A-106D are provided on the front side of the smartphone 100. Other microphones may additionally, or alternatively, be provided on the rear side of the smartphone 100 and/or on one or more sides of the smartphone. By providing two or more microphones 102, 106A-106D on the smartphone 100, the smartphone may be configured to produce a spatial audio signal which includes captured sounds with a spatial percept. The spatial percept may enable a user listening to the spatial audio signal to perceive where one or more sounds, such as speech from a user of the smartphone 100, is or are coming from. The spatial audio signal may be produced by the smartphone 100 using conventional processing techniques; the format of the spatial audio signal may, for example, be any one of a channel-based, object-based and/or Ambisonics-based spatial audio format, although example embodiments are not limited to such examples. The smartphone 100 may comprise hardware and/or software functionality for generating the spatial audio signal, which may be transmitted in data form as part of a video conference.

The smartphone 100 may also comprise additional first and second loudspeakers 108A, 108B at different positions on the smartphone. One or both of the first and second loudspeakers 108A, 108B may be configured to render received audio data, which may be received as part of a video conference, in a monaural, stereo or spatial audio format.

For example, metadata which is associated with the received audio data may enable the smartphone 100 to determine the appropriate audio format and to render the audio data appropriately. Additionally, or alternatively, the number of audio channels comprised by the received audio data may be indicative of the appropriate audio format.

For example, spatial audio data may be decoded and output such that the user of the smartphone 100 can perceive one or more sounds from a transmitting other user device as coming from a particular direction in the audio field that at least partly surrounds them.

Additionally, or alternatively, the received audio data may be rendered and output to an associated user device, such as earbuds, earphones, headphones or a head-mounted device (HMD).

Figure 2:
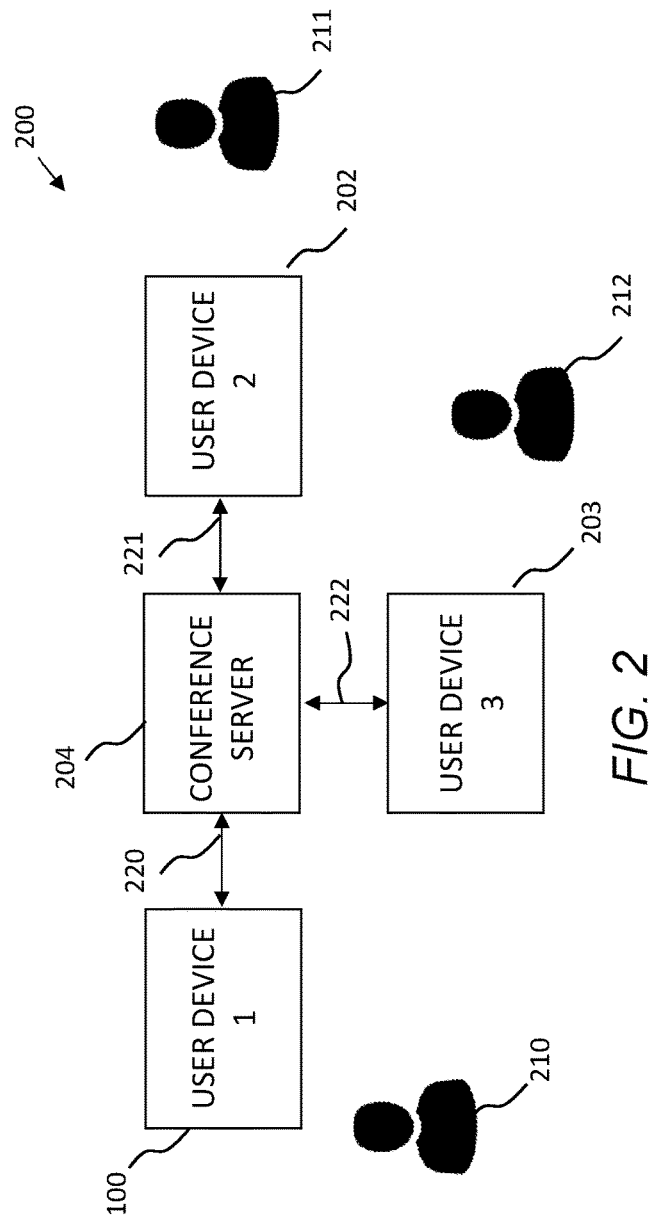
FIG. 2 is a block diagram of a first video conference system.

Referring to FIG. 2, a video conference system 200 is shown.

The video conference system 200 may comprise a first user device 100, a second user device 202, a third user device 203 and a conference server 204. It may be assumed that the smartphone 100 described in relation to FIG. 1 comprises the first user device 100.

For the sake of illustration, the video conference system 200 shown in FIG. 2 only comprises two remote devices, namely the second user device 202 and the third user device 203, but the video conference system may comprise any number of user devices involved in a videoconference session. A later example, described with reference to FIG. 3, comprises additional user devices.

A first user 210 may use the first user device 100, a second user 211 may use the second user device 202 and a third user 212 may use the third user device 203. The user devices 100, 202, 203 may, as is typical, be in different remote places.

The second and third user devices 202, 203 may comprise any of, for example, a smartphone, a digital assistant, a digital music player, a personal computer, a laptop, a tablet computer or a wearable device such as a smartwatch. The second and third user devices 203 may comprise the same or similar functionality to the first user device 100, respectively comprising, for example, a display screen, one or more microphones, one or more loudspeakers and one or more front-facing cameras. It may be the case that at least one of the second and third user devices 202, 203 may be capable of spatial audio capture, as is the case for the first user device 100.

Each of the first, second and third user devices 100, 202, 203 may communicate streams of captured video and audio data with the other user devices via the conference server 204 as part of a conference session, in this example in a video conference.

For example, the first user device 100 may communicate a video stream and an accompanying audio stream of the first user 210 talking, e.g. when the first user is facing the front-facing camera 104. The video and audio streams may be transmitted over a first channel 220 established between the first user device 100 and the conference server 204. The video and audio streams may then be transmitted by the conference server 204 to the second and third user devices 202, 203 over respective second and third channels 221, 222 using, or in the manner of, a multi-cast transmission protocol established between the conference server and the second and third user devices. Although the first, second and third channels 220, 221, 222 are represented by single lines, indicative of bidirectional channels, there may be separate channels, one for transmission and one for reception. The same principles of operation apply to the second and third user devices 202, 203 when communicating video and audio streams as part of a conference session.

The video and audio streams may comprise video packets and associated audio packets. The video packets and the audio packets may comply with any suitable conference standard, such as the Real Time Protocol (RTP). The video packets and the audio packets may, for example, comprise a packet header comprising control information and a packet body comprising the video or audio data content. The packet header may, for example, comprise a sequence number, which indicates the sequential position of a packet in a stream of transmitted packets. The packet header may also comprise a timestamp which indicates the timing of transmitting the packet. The packet body may comprise encoded video or video audio which was captured during a time slot before transmitting the packet. For example, video data of a packet may comprise a sequence of images representing encoded pixels and spatial coordinates.

One or more of the first, second and third user devices 100, 202, 203 and the conference server 204 may comprise an apparatus such as that shown and described below with reference to FIG. 10. One or more of the first, second and third user devices 100, 202, 203 and the conference server 204 may be configured by means of hardware, software, firmware or a combination thereof to perform operations described below, for example with reference to FIG. 4.

Figure 3:
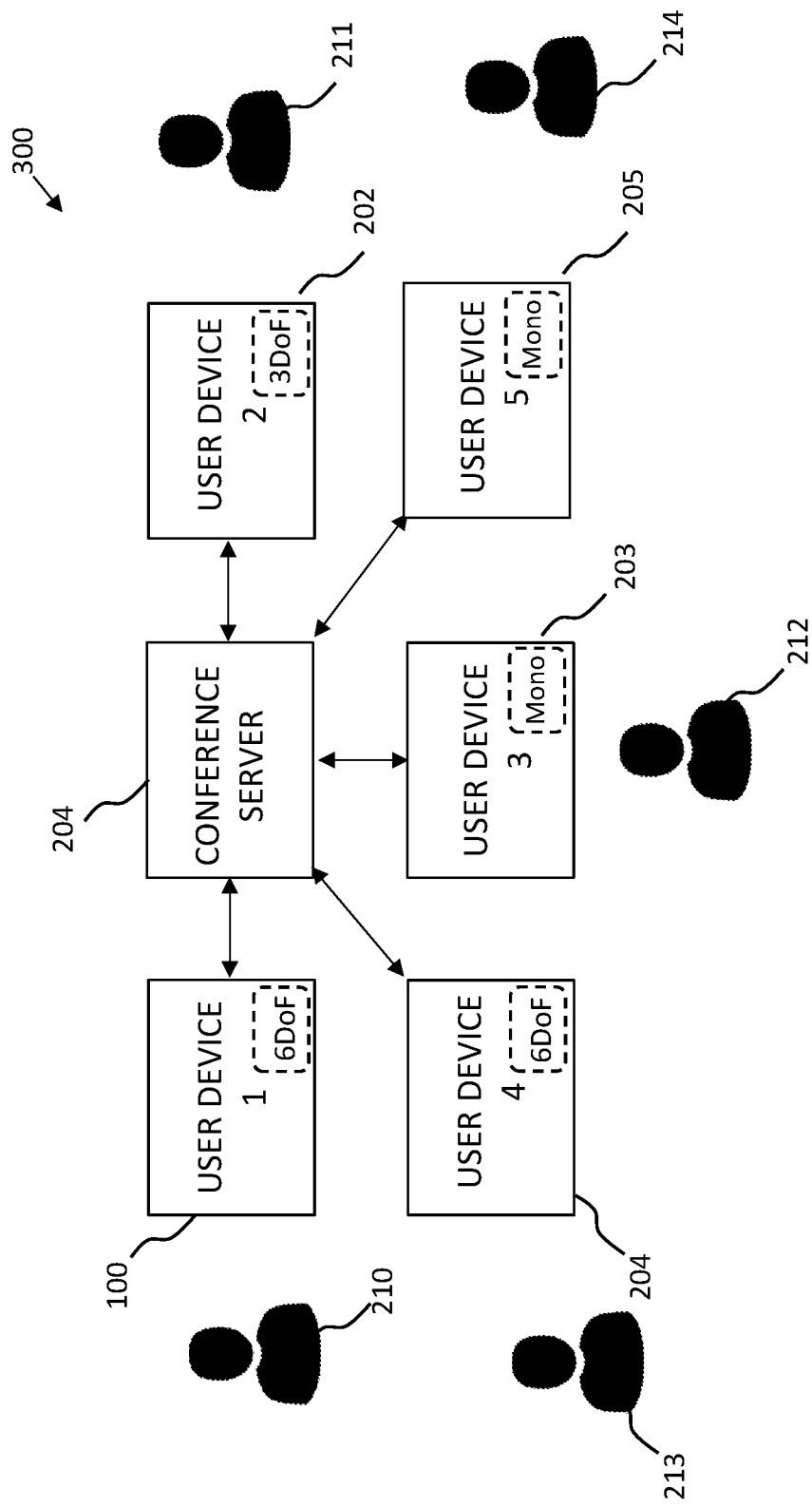
FIG. 3 is a block diagram of a second video conference system according to one or more example embodiments.

FIG. 3 shows another video conference system 300 providing a video conference.

The video conference system 300 is similar to that shown in FIG. 2 in that it comprises a first user device 100, a second user device 202, a third user device 203 and a conference server 204.

The video conference system 300 additionally comprises fourth and fifth user devices 204, 205. The fourth user device 204 is associated with a fourth user 213 and the fifth user device 205 is associated with a fifth user 214.

Again, it may be assumed that the smartphone 100 described in relation to FIG. 1 comprises the first user device 100.

Example audio capture capability information for each of the first to fifth user devices 100, 202, 203, 204, 205 is indicated in dashed boxes.

For example, the first user device 100 has the spatial audio capture capability as mentioned 30 above, making use of the first to fourth additional microphones 106A-106D. The spatial audio capture capability information is labelled "6DoF" for reasons given below.

Position tracking data may accompany the spatial audio data produced by the first user device 100. That is, the spatial audio data and the position tracking data may be transmitted to the second to fifth user devices 202, 203, 204, 205 as part of the conference session. In this respect, the first user device 100 may track the position of the first user 210 relative to the first user device during video and audio capture. The position tracking data may be based on one or more of audio analysis and video analysis. For example, the position tracking data may be determined based on angle-of-arrival audio measurements performed using the first to fourth additional microphones 106A-106D. Additionally, or alternatively, the position tracking data may be determined based on image analysis during video capture, for example using head tracking.

The position tracking data may relate to the tracked orientation of the first user 210 (which can mean at least part of the first user, e.g. their head) and also their translational movement in Euclidean space. Hence, the first user 210 can be tracked using 6DoF and hence this is indicated in the spatial audio capture capability information.

Where the position tracking data relates only to the tracked orientation of a user, the spatial audio capture capability information is labelled as "3DoF".

From FIG. 3 it will be seen that the second user device 202 has a 3DoF spatial audio capture capability, the third user device 203 has a monaural ("mono") audio capture capability, the fourth user device 204 has a 6DoF spatial audio capture capability and the fifth user device 205 has a monaural audio capture capability.

Example embodiments may enable users, for example one or more of the first to fifth users 210-214, to understand the audio capture capabilities of other user devices which are party to the video conference call.

Figure 4:
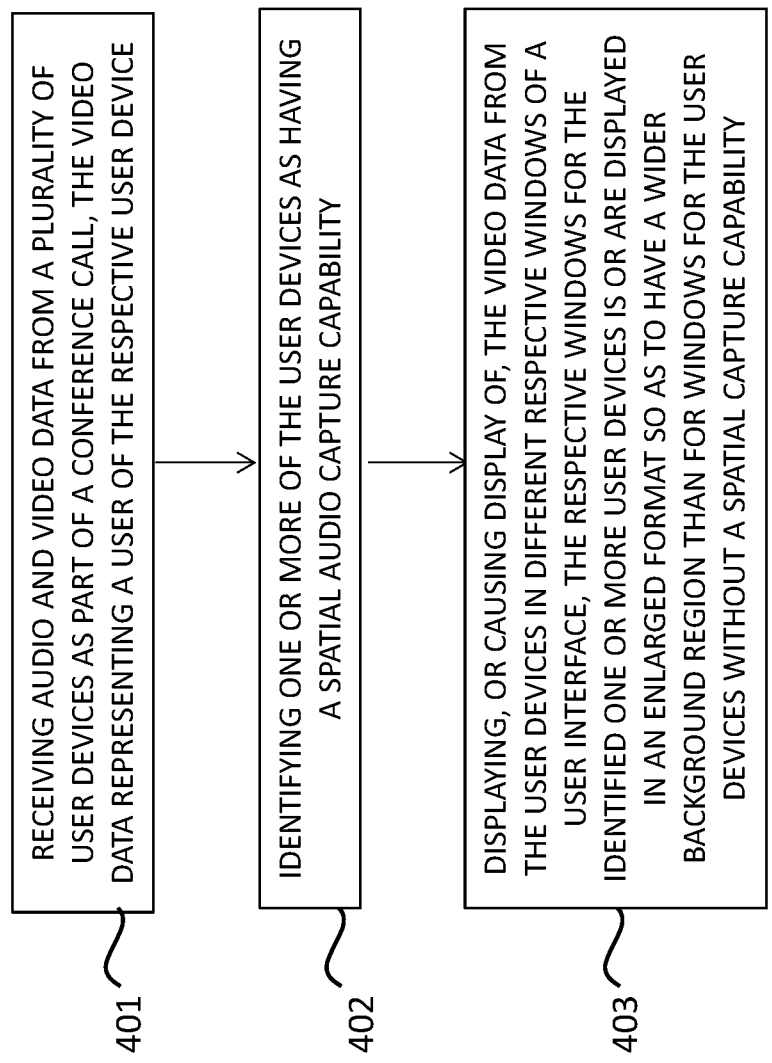
FIG. 4 is a flow diagram showing processing operations according to one or more example embodiments.

FIG. 4 is a flow diagram indicating processing operations that may be performed by, for example, the first user device 100 according to one or more example embodiments. The processing operations may also, or alternatively, be performed by one or more of the second to fifth user devices 202-205 and/or even the conference server 204. The processing operations may be performed by means of hardware, software, firmware or a combination thereof.

A first operation 401 may comprise receiving audio and video data from a plurality of user devices as part of a conference call, the video data representing a user, or at least part of a user, of the respective user device.

At least part of the audio data from a given user device may represent speech of the relevant user of a given user device. There may be other background sounds also represented in the audio data.

A second operation 402 may comprise identifying one or more of the user devices as having a spatial audio capture capability.

For example, identifying may be based on metadata or similar data that may accompany the audio and video data.

A third operation 403 may comprise displaying, or causing display of, the video data from the user devices in different respective windows of a user interface, wherein the respective windows for the identified one or more user devices is or are displayed in an enlarged format so as to have a wider background region than for windows for the user devices without a spatial capture capability.

A window in this regard may comprise a display region of a user interface and is not necessarily limited to a display region having a square or rectangular shape.

A background region may refer to one or more portions of an image that surround a foreground object.

A foreground object may refer to an object, e.g. represented by a blob of pixels, that is closest to the camera, which corresponds to a particular object, e.g. a user, and/or which is positioned, initially at least, in a central region of the captured image. A foreground object may be a user, or at least part of a user, facing a camera of the user device from which the video data is received. The foreground object may include a user's face, for example.

The background region may comprise live video data representing captured video around or outside the foreground object as part of a conference call or it may comprise a predetermined background image, animation or video clip. Conventional image segmentation methods are capable of distinguishing foreground and background regions, e.g. based on position and/or movement. The foreground region may be cropped and/or scaled and applied on top of the background region, whether as captured video or a predetermined image, animation or video clip. The foreground region may remain substantially the same size regardless of the enlargement of the background region, but there may be reasons that the foreground region can change size, e.g. if the user moves towards, or away from, the camera of the user device they are using.

In this way, a user, e.g. the first user 210, may know the audio capture capabilities of one or more other user devices that are party to a video conference call based at least on the enlarged format of the windows.

For example, a standard size window may indicate that its associated user device has a monaural audio capture capability whereas an enlarged format window may indicate that its associated user device has a spatial audio capture capability. A standard size window may be square or have, for example, a 4:3 aspect ratio. An enlarged format window may have, for example, a 16:9 or 16:10 aspect ratio or similar.

This may, for example, prompt a receiving user or user device to enable a spatial audio rendering function in order to experience spatial audio rendering for at least some of the audio data.

Figure 5:
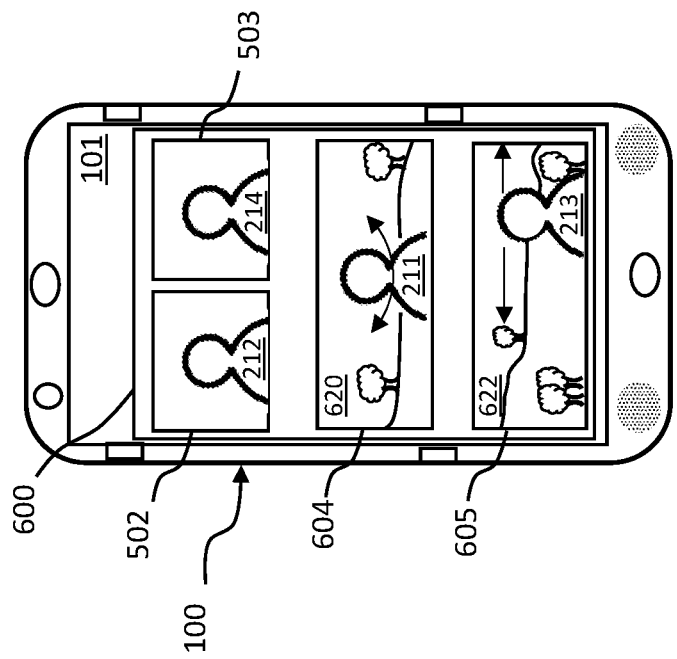
FIG. 5 is a front plan view of the FIG. 1 user device, showing a user interface with windows arranged according to one or more example embodiments.

FIG. 5 is a front view of the first user device 100 according to an example embodiment. The display 101 of the first user device 100 shows a user interface 500 associated with a video conference call established using the FIG. 3 video conference system 300 according to an example embodiment.

The user interface 500 displays first to fourth windows 502, 503, 504, 505. The first and second windows 502, 503 display video data received from the third and fifth user devices 203, 205 respectively. The third and fifth users 212, 214 are shown as foreground objects.

The third window 504 displays video data received from the second user device 202. The second user 211 is shown as a foreground object. The fourth window 505 displays video data received from the fourth user device 204. The fourth user 213 is shown as a foreground object.

The size, and in particular the width, of the first and second windows 502, 503 may be considered a standard or default size, based on the fact that the audio capture capabilities of the third and fifth user devices 203, 205 are limited to monaural. The size of the third window 504 is in an enlarged format such that the width of the background region 520 is wider than that of the first and second windows 502, 503. The wider display of the third window 504 is based on metadata from the second user device 202 indicating a spatial audio capture capability. The size of the fourth window 505 is also in an enlarged format such that the width of the background region 522 is wider than that of the first and second windows 502, 503. The wider display of the fourth window 505 is based on metadata from the fourth user device 204 indicating a spatial audio capability.

In this case, it will be seen that the fourth window 505 is wider in terms of the background region than that of the third window 504. This indicates that the fourth user device 204 is capable of 6DoF tracking whereas the second user device 202 is capable of only 3DoF tracking.

In addition to indicating to the first user 210 the audio capture capabilities of the second to fifth user devices 202, 203, 204, 205, the enlarged third and fourth windows 504, 505 permit a greater degree of motion that may be exhibited over time by the second and fourth users 211, 213 which may track the direction of the spatial audio data from said users.

If the first user device 100 is capable of spatial audio rendering, then the direction from which audio from the second user 211 is perceived by the first user 210 may be the centre of the user interface 500 based on their position with respect to the second user device 202. There may be some spatial change with changing orientation of the second user 211.

Similarly, the direction from which audio from the fourth user 213 is perceived by the first user 210 may be with a greater amount of translational change that tracks motion of the user. For example, the fourth user 213 is shown to the right hand side of the fourth window 505 and hence audio may be perceived by the first user 210 from this direction.

It is therefore seen that the enlarged format of the third and fourth windows 504, 505 allow more realistic and intuitive tracking of the respective second and fourth user's position which is further reflected by the directional nature of their respective audio renderings.

Figure 6:
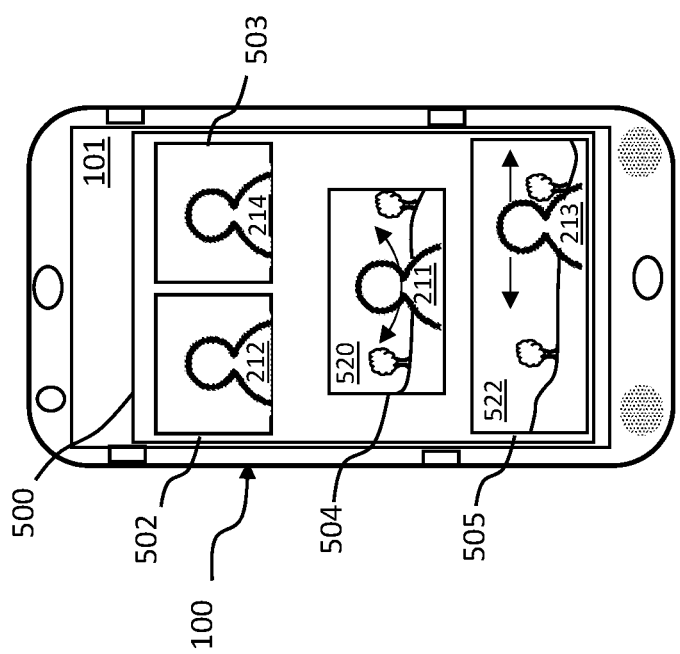
FIG. 6 is a front plan view of the FIG. 1 user device, showing a user interface with windows arranged according to one or more example embodiments.

FIG. 6 is a plan view of the first user device 100 according to another example embodiment. FIG. 6 is similar to that of FIG. 5. In this case, a different user interface 600 is shown.

The user interface 600 includes the same first and second windows 502, 503. However, in this case, the third window 604 has a same or similar width as the fourth window 605 and the difference in respective audio capture capabilities of the second and fourth user devices 202, 204 is reflected by the format of their respective background regions.

In particular, the 3DoF tracking capability of the second user device 202 is indicated by the background region 620 of the third window 604 using a standard image format. The 6DoF tracking capability of the fourth user device 205 is indicated by the background region 622 of the fourth window 605 using a wider angle image format, e.g. in the manner of a wide-angle lens having a greater focal length. For example, if the background region is a predetermined background image, then focal length information in the image metadata may be used to select a wind-angle version.

In the case that two or more of the second to fifth user devices 202, 203, 204, 205 are capable of 6DoF tracking, a distinction may be made based on the amount of tracked movement of respective users 211, 212, 213, 214.

For example, if the second user device 202 is capable of 6DoF tracking instead of only 3DoF tracking, then the user interface examples shown in FIGS. 5 and 6 may still be applicable. For example, this may occur if translational movement of the fourth user 213 is greater than that of the second user 211, at least over a predetermined time period.

According to some example embodiments, the display of the enlarged format windows, e.g. the third and fourth windows 504, 505, 604, 605 in the FIGS. 5 and 6 examples, may occur responsive to the amount of tracked movement being over a predetermined threshold.

That is, initially, all windows may be displayed at a default, relatively small size, e.g. with all windows having the size of the first and second windows 502, 503. Then, responsive to one or more user devices with a spatial audio capture capability (whether 3DoF or 6DoF) providing positional data indicative of significant movement, the appropriate window or windows may enlarge in the manner described in any example given above.

In some example embodiments, an increasing amount of tracked movement, particularly translational movement, may result in an increasing widening of the appropriate window and therefore background region. A subsequent decreasing amount of tracked movement may result in a narrowing of the appropriate window and therefore background movement.

In some example embodiments, if it is determined that a particular user, e.g. the fourth user 213, moves outside of the current bounds of the fourth window 505, 605, the background region may scroll to "catch-up" with the tracked motion.

In some example embodiments, if it is determined that a particular user, e.g. the fourth user 213, is moving closer (advancing) to or away (retreating) from the camera of the fourth user device 204, the background region in the fourth window 505, 605 may scale appropriately, e.g. to enlarge or shrink. In some example embodiments, the spatial audio that is rendered for an advancing or retreating user, such as the fourth user 213, may be modified in sympathy with such tracked motion, e.g. to adapt reverberation as the user get closer to, or further away from, the camera of the fourth user device 204. There may be a set limit for the distance-based rendering in this case, due to the commonly-used distance gain attenuation, if in use.

In some example embodiments, a selection may be received in respect of one or more of the identified user devices, e.g. the second or fourth user devices 202, 204, with the enlarged window format.

Selection may be received by means of an input received using the user interface 101, the input corresponding to one or more of the windows. In response to the selection, the user interface 101 may be modified such that the one or more corresponding enlarged format windows are further increased in size, which can be one or both of a horizontal and vertical increase in size. This provides more space for visual tracking of the relevant foreground object, e.g. the relevant user, which may be appropriate if the user device has 60D tracking.

For ease of explanation, it will hereafter be assumed that the second user device 202 is also capable of 60D tracking and that the second user 211 moves with some translational motion.

Figure 7B:
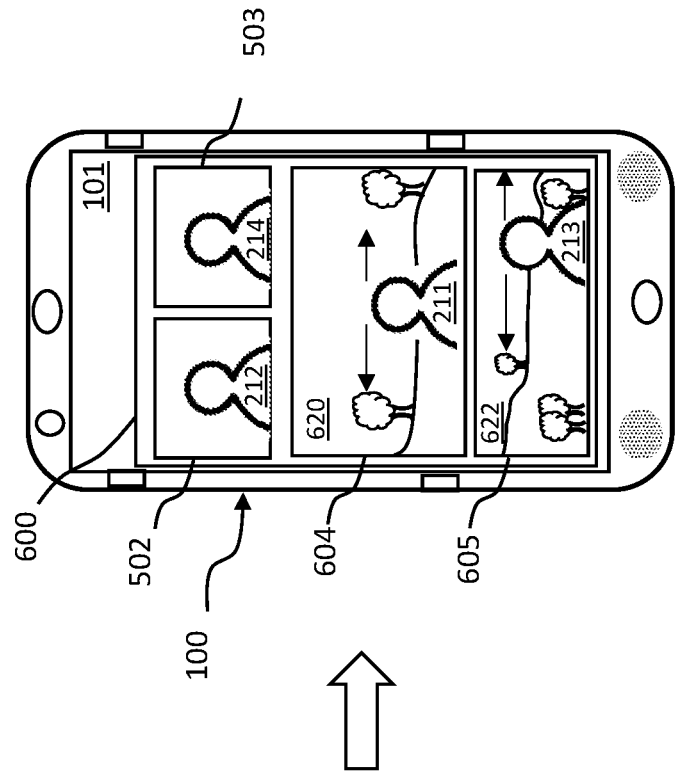
FIG. 7B is a front plan view of the FIG. 1 user device, showing the user interface of FIG. 7A at a subsequent time responsive to a user selection.
Figure 7A:
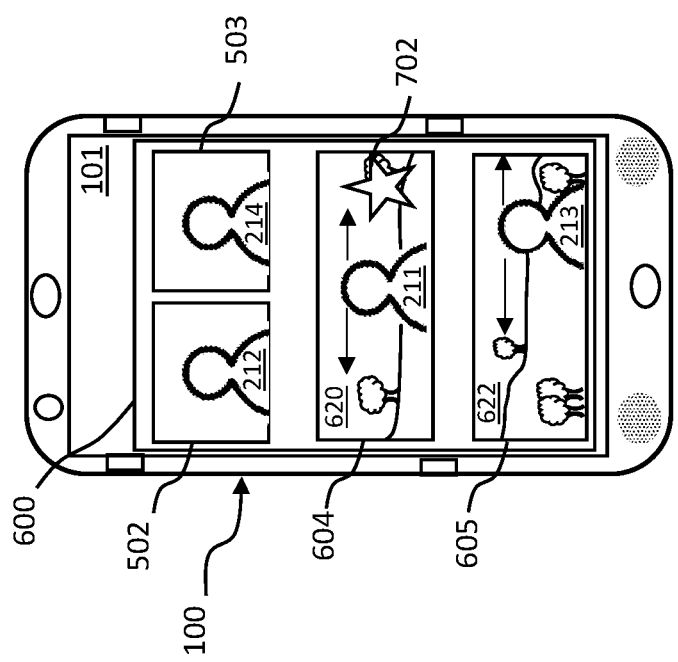
FIG. 7A is a front plan view of the FIG. 1 user device, showing a user interface with windows arranged according to one or more example embodiments.

Referring to FIG. 7A, selection of the second user device 202 is effected by selection of the third window 604 on the user interface 600. In FIG. 7A, reference numeral 702 indicates a touch input effected by the first user 210. Selection may be received by means of a cursor or mouse-based input, a gesture input or a voice command. Alternatively or additionally, selection may be based on which user is currently speaking or at least speaks with the greatest amplitude, as can be determined by comparison with the audio data from the various other user devices.

As shown in FIG. 7B, the result is an increase in the vertical extent of the third window 604 with a greater portion of its background region 620 visible. In this case, no size modification of the first, second and fourth windows 502, 503, 605 is necessary. However, if there is insufficient space available on the user interface 600, one or more of the first, second and fourth windows 502, 503, 605 may be decreased in size, or changed in position, to permit the further increase in size. Scrolling of the background region 620 may also be permitted if the fourth user moves close to, or beyond, the bounds of the third window 604.

Figure 8B:
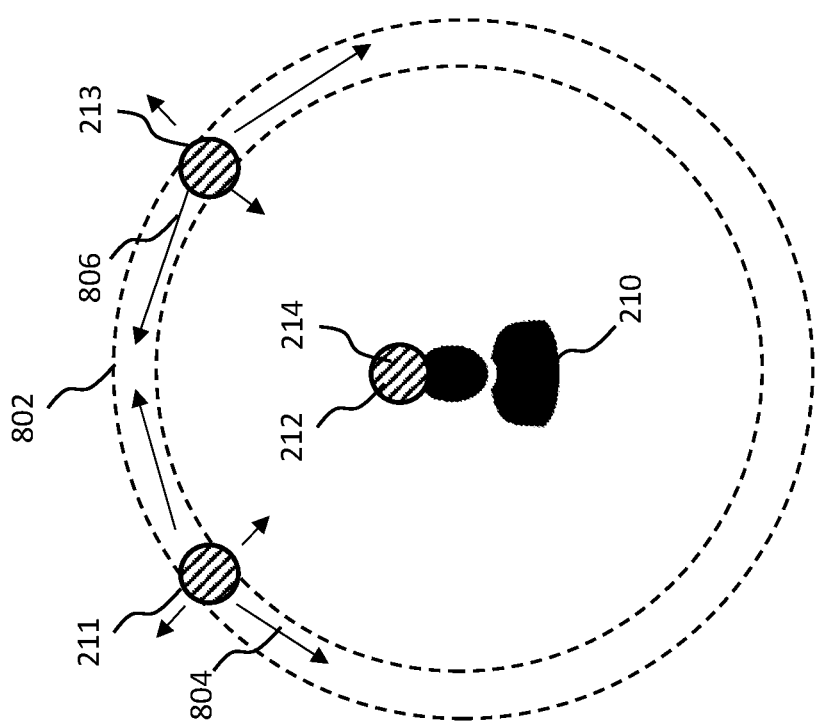
FIG. 8B shows in top plan view a spatial audio field experienced by a user based on the other user positions shown in FIG. 8A.
Figure 8A:
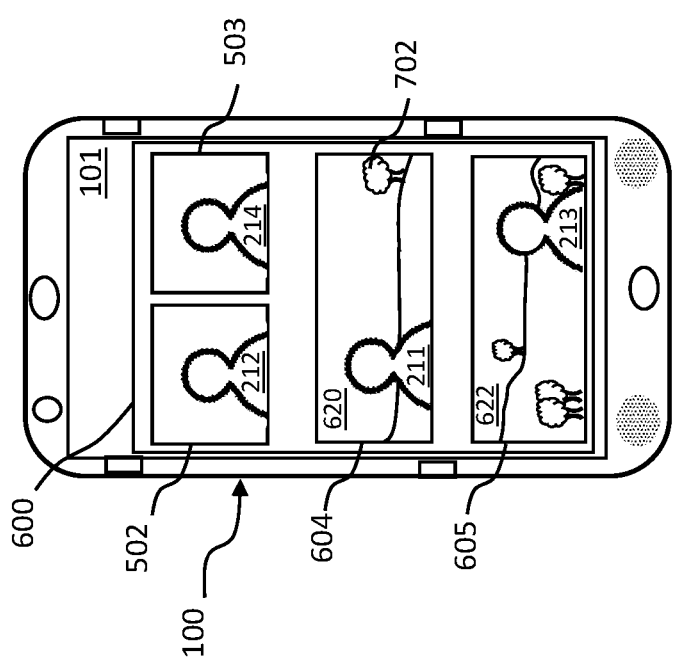
FIG. 8A is a front plan view of the FIG. 1 user device, showing a user interface with windows arranged according to one or more example embodiments.

FIG. 8A is a front view of the first user device 100 according to another example embodiment.

It will be seen that, in the third window 604, the second user 211 has moved to the left hand side due to translational motion. Otherwise, respective positions of the third, fourth and fifth users 212, 213, 214 have not changed.

FIG. 8B shows in top plan view the spatial audio field 802 experienced by the first user 210 based on the FIG. 8A positions.

Audio data representing the third and fifth users 212, 214 is in monaural format and hence have no directional properties. The rendered audio may be perceived centrally by the first user 210.

Audio data representing the second user 211 is spatial audio data with, in this case, 6DoF tracking and hence is perceived from a direction in front of, and to the left of the first user 210. The arrows 804 indicate the range of positions within the spatial audio field 802 from where the rendered audio can be perceived due to translational motion of the second user 211.

Audio data representing the fourth user 213 is also spatial audio data with 6DoF tracking and hence is perceived from a direction in front of, and to the right of the first user 210. The arrows 806 indicate the range of positions within the audio field 904 from where the rendered audio can be perceived due to translational motion of the fourth user 213.

Figure 9B:
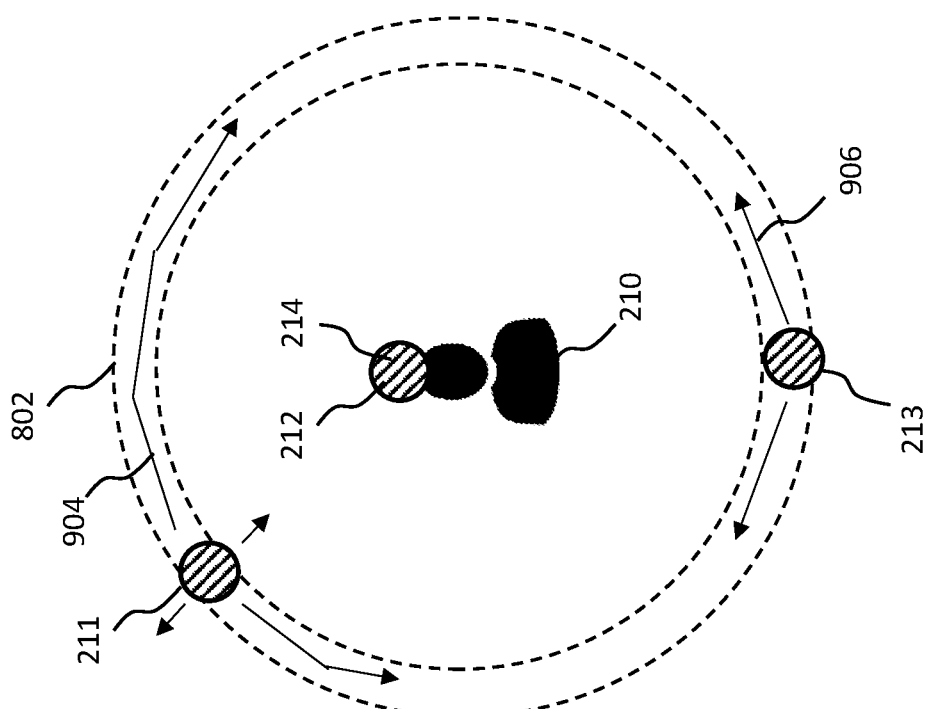
FIG. 9B shows in top plan view a spatial audio field experienced by a user based on the other user positions shown in FIG. 9A.
Figure 9A:
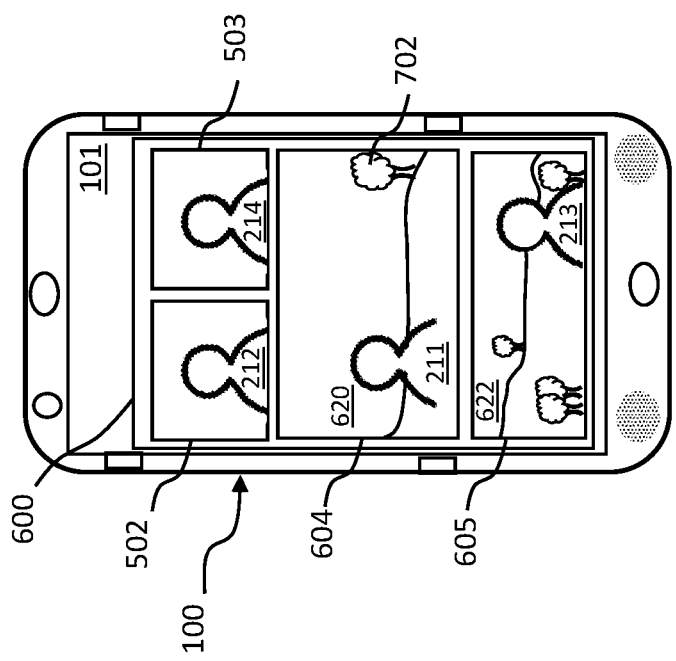
FIG. 9A is a front plan view of the FIG. 1 user device, showing a user interface with windows arranged according to one or more example embodiments.

FIG. 9A is a front view of the first user device 100 subsequent to receiving selection of one of the identified user devices, in this case the second user device 202 via the third window 604.

This selection of the second user device 202 may result in a wider range of positions within the audio field from where the rendered audio can be perceived due to translational motion of the second user 211. The arrows 904 indicate the range of positions within the audio field 904 from where the rendered can be perceived. Audio data from non-selected user devices, such as the fourth user device 204, may be rendered either in a restricted audio format, such as monaural or stereo, in a spatial format with only 3DoF tracking, or in a spatial format with 6DoF tracking over a narrower range of positions. FIG. 9B, for example, shows that the fourth user 213 is now heard from behind the first user 210 and the arrows 906 indicate a narrower range of positions within the audio field 904 from where the audio data can be perceived.

Example embodiments therefore provide an intuitive and more meaningful way for users involved in a video conference to understand audio capture capabilities of other user devices. This may prompt enablement of spatial audio rendering capabilities at their own device. Furthermore, the widening of the background region for users with spatial audio capture capabilities allows their potential or actual movements to be visible and makes for a better user experience because the spatial nature of the audio at least partly tracks such visible movement.

Example Apparatus

Figure 10:
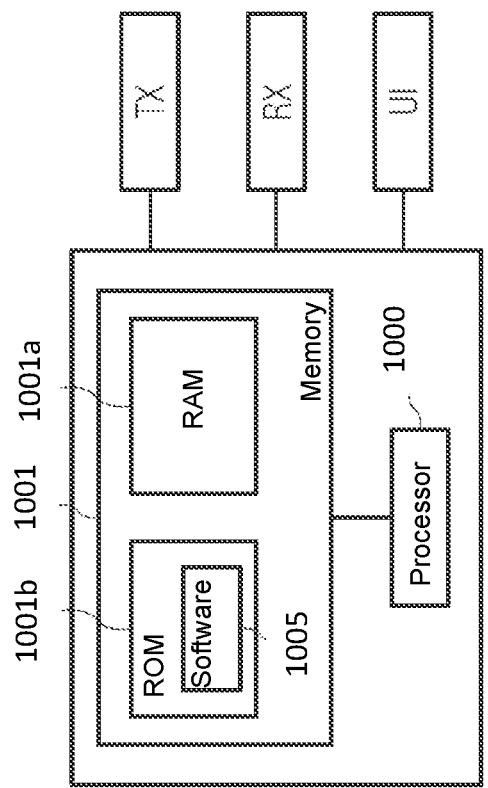
FIG. 10 is a block diagram of an apparatus according to one or more example embodiments.

FIG. 10 shows an apparatus according to some example embodiments. The apparatus may be configured to perform the operations described herein, for example operations described with reference to any disclosed process. The apparatus comprises at least one processor 1000 and at least one memory 1001 directly or closely connected to the processor. The memory 1001 includes at least one random access memory (RAM) 1001a and at least one read-only memory (ROM) 1001b. Computer program code (software) 1005 is stored in the ROM 1001b. The apparatus may be connected to a transmitter (TX) and a receiver (RX). The apparatus may, optionally, be connected with a user interface (UI) for instructing the apparatus and/or for outputting data. The at least one processor 1000, with the at least one memory 1001 and the computer program code 1005 are arranged to cause the apparatus to at least perform at least the method according to any preceding process, for example as disclosed in relation to the flow diagrams of FIG. 4 and related features thereof.

Figure 11:
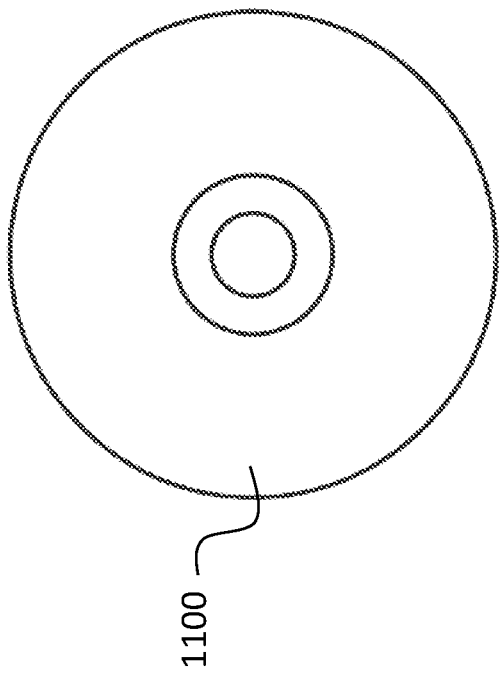
FIG. 11 is a non-transitory computer readable medium on which instructions may be stored for implementing one or more example embodiments.

FIG. 11 shows a non-transitory media 1100 according to some embodiments. The non-transitory media 1100 is a computer readable storage medium. It may be e.g. a CD, a DVD, a USB stick, a blue ray disk, etc. The non-transitory media 1100 stores computer program instructions, causing an apparatus to perform the method of any preceding process for example as disclosed in relation to the flow diagrams of FIG. 4 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
   at least one processor; and
   at least one memory storing instructions that, when executed by the at least one processor, cause the apparatus at least to:
      receive audio and video data from a plurality of user devices as part of a conference call, the video data representing a user of a respective user device;
      identify one or more of the user devices as having a spatial audio capture capability; and
      display, or cause display of, the video data from the user devices in different respective windows of a user interface, wherein the respective windows for the identified one or more user devices is or are displayed in an enlarged format so as to have a wider background region than for windows for the user devices without a spatial capture capability, wherein the identifying further comprises identify user devices as having a spatial audio capture capability and which can track a position of the user over time, and wherein the displaying further comprises display the one or more enlarged format windows such that at least one of the width or format of the background region is based on whether the tracking uses three degrees of freedom or six degrees of freedom.

2. The apparatus of claim 1, wherein the audio data represents, at least in part, speech of the user of the respective user device captured using the user device's audio capture capability.

3. The apparatus of claim 1, wherein the width of the background region is greater if the tracking uses six degrees of freedom than if the tracking uses three degrees of freedom.

4. The apparatus of claim 1, wherein the enlarged format of the background region uses a wider-angle image format if the tracking uses six degrees of freedom than if the tracking uses three degrees of freedom.

5. The apparatus of claim 1, wherein the displaying further comprises display the one or more enlarged format windows responsive to an amount of tracked movement of the user being over a predetermined threshold.

6. The apparatus of claim 1, wherein the width of the background region is increased with an increase in an amount of tracked movement of the user.

7. The apparatus of claim 1, wherein the enlarged format of the background region is set to a wider-angle image format responsive to an amount of tracked movement of the user being over a predetermined threshold.

8. The apparatus of claim 1, wherein the audio data for the identified one or more user devices is rendered so as to be perceived as coming from a direction based on the tracked position of the user.

9. The apparatus of claim 1, further caused to receive selection of one or more particular user devices based on selection of one or more of the enlarged format windows, the displaying being configured to further increase the size of the enlarged format windows based the selection.

10. The apparatus of claim 9, wherein the audio data from the one or more selected user devices is rendered so as to be coming from a position within a wider range of positions based on the tracked position of the respective user, than for the audio data from a non-selected user device.

11. The apparatus of claim 9, wherein the selection further comprises receive selection via one or more of:
an input received using the user interface corresponding to the particular enlarged window; or
a current speaker identified using the audio data from the user device associated with the particular enlarged window.

12. The apparatus of claim 1, wherein the background region comprises:

video data representing captured video around or outside of at least part of the user as part of the conference call; or a predetermined image or video clip.

13. A method, the method comprising:
receiving audio and video data from a plurality of user devices as part of a conference call, the video data representing a user of a respective user device;
identifying one or more of the user devices as having a spatial audio capture capability; and
displaying, or causing display of, the video data from the user devices in different respective windows of a user interface,
wherein the respective windows for the identified one or more user devices is or are displayed in an enlarged format so as to have a wider background region than for windows for the user devices without a spatial capture capability,
wherein the identifying further comprises identifying user devices as having a spatial audio capture capability and which can track a position of the user over time, and
wherein the displaying further comprises displaying the one or more enlarged format windows such that at least one of the width or format of the background region is based on whether the tracking uses three degrees of freedom or six degrees of freedom.

14. The method of claim 13, wherein the audio data represents, at least in part, speech of the user of the respective user device captured using the user device's audio capture capability.

15. The method of claim 13, wherein the width of the background region is greater if the tracking uses six degrees of freedom than if the tracking uses three degrees of freedom.

16. A non-transitory computer readable medium comprising program instructions stored thereon for performing at least the following:
receiving audio and video data from a plurality of user devices as part of a conference call, the video data representing a user of a respective user device;
identifying one or more of the user devices as having a spatial audio capture capability; and
displaying, or causing display of, the video data from the user devices in different respective windows of a user interface,
wherein the respective windows for the identified one or more user devices is or are displayed in an enlarged format so as to have a wider background region than for windows for the user devices without a spatial capture capability,
wherein the identifying further comprises identify user devices as having a spatial audio capture capability and which can track a position of the user over time, and
wherein the displaying further comprises display the one or more enlarged format windows such that at least one of the width or format of the background region is based on whether the tracking uses three degrees of freedom or six degrees of freedom.

* * * * *